(12) United States Patent
Nie et al.

(10) Patent No.: US 10,600,003 B2
(45) Date of Patent: Mar. 24, 2020

(54) AUTO-TUNE ANOMALY DETECTION

(71) Applicant: Microsoft Technology Licensing, LLC, Redmond, WA (US)

(72) Inventors: Kexin Nie, Sunnyvale, CA (US); Yang Yang, Fremont, CA (US); Baolei Li, Santa Clara, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 150 days.

(21) Appl. No.: 16/024,809

(22) Filed: Jun. 30, 2018

(65) Prior Publication Data

US 2020/0005193 A1 Jan. 2, 2020

(51) Int. Cl.
*G06N 20/00* (2019.01)
*G06F 11/07* (2006.01)

(52) U.S. Cl.
CPC ......... *G06N 20/00* (2019.01); *G06F 11/0709* (2013.01); *G06F 11/0751* (2013.01); *G06F 11/0772* (2013.01); *G06F 11/0775* (2013.01)

(58) Field of Classification Search
CPC .. G06F 21/566; G06F 21/577; G06F 11/3419; G06F 11/0751; G06F 11/2263
See application file for complete search history.

(56) References Cited

U.S. PATENT DOCUMENTS

| | | | | |
|---|---|---|---|---|
| 10,037,668 B1* | 7/2018 | DesGarennes | ..... | G08B 21/0423 |
| 2005/0283511 A1* | 12/2005 | Fan | ........ | G06F 11/008 708/306 |
| 2012/0317104 A1* | 12/2012 | Radlinski | ............ | G06F 16/9535 707/724 |
| 2016/0142435 A1* | 5/2016 | Bernstein | ............ | H04L 63/1441 726/23 |
| 2017/0193140 A1* | 7/2017 | Brothers | ............ | G06K 9/00557 |
| 2019/0325264 A1* | 10/2019 | Keserich | ............ | G01C 21/3602 |

* cited by examiner

*Primary Examiner* — Matthew M Kim
*Assistant Examiner* — Matthew N Putaraksa
(74) *Attorney, Agent, or Firm* — Hickman Palermo Becker Bingham LLP

(57) ABSTRACT

Techniques for auto-tuning anomaly detection are provided. In one technique, training data is stored that comprises training instances, each of which comprises a severity-duration pair and a label that indicates whether the severity-duration pair represents an anomaly. A model is trained based on a first subset of the training data. A second subset of the training data is identified where each training instance includes a positive label that indicates that that training instance represents an anomaly. Based on the second subset of the training data, the model generates multiple scores, each of which corresponds to a different training instance. A minimum score is identified that ensures a particular recall rate of the model. In response to receiving a particular severity-duration pair, the model generates a particular score for the particular severity-duration pair. A notification of an anomaly is generated if the particular score is greater than the minimum score.

20 Claims, 10 Drawing Sheets

Alert Performance
Last trained on Oct 31st, 2017 19:40 PDT

| Number of anomalies | Response rate | Precision | Recall | MTTD for >30% change |
|---|---|---|---|---|
| Total number of anomalies that received votes in previous 60 days | % of anomalies that were responded | % of anomalies detected by the system that are true | % of all anomalies detected by the system that are true | Maximum time for alarm for anomalies with >30% change |
| 10 | 87.1% | 87.1% | 87.1% | 4.8 mins |
| Projected: 5 | Projected: 89.5% | Projected: 89.5% | Projected: 89.5% | Projected: 5 mins |

⊙ Customize Sensitivity

Anomalies removed with new settings

The following previously seen anomalies would not have sent under the new settings.

| | | |
|---|---|---|
| 10 All | 2 True Anomalies | 8 False Alarms | 0 User Created |

| Start/Duration (PDT) | Dimensions | Severity Score | Current / WoW | Resolution |
|---|---|---|---|---|
| Apr 7, 08:32 AM<br>1 day, 9 hours, 55 mins | country: US<br>page_name: d_flagship3_messaging<br>page_load_mode: PARTIAL | 0.86 | 1,445,000 / 1,000,000<br>(-30.5%) | True Anomaly |
| Apr 7, 08:32 AM<br>1 day, 9 hours, 55 mins | country: US<br>page_name: d_flagship3_messaging<br>page_load_mode: PARTIAL | 0.86 | 1,445,000 / 1,000,000<br>(-30.5%) | User reported |
| Apr 7, 08:32 AM<br>1 day, 9 hours, 55 mins | country: US<br>page_name: d_flagship3_messaging<br>page_load_mode: PARTIAL | 0.86 | 1,445,000 / 1,000,000<br>(-30.5%) | False Alarm |
| Apr 7, 08:32 AM<br>1 day, 9 hours, 55 mins | country: US<br>page_name: d_flagship3_messaging<br>page_load_mode: PARTIAL | 0.86 | 1,445,000 / 1,000,000<br>(-30.5%) | False Alarm |
| Apr 7, 08:32 AM<br>1 day, 9 hours, 55 mins | country: US<br>page_name: d_flagship3_messaging<br>page_load_mode: PARTIAL | 0.80 | 1,445,000 / 1,000,000<br>(-30.5%) | True Anomaly |

AUTO-TUNE ANOMALY DETECTION

TECHNICAL FIELD

The present disclosure relates to anomaly detection in a computer system and, more particularly to, a data driven process to constantly improve anomaly detection and reporting.

BACKGROUND

Modern computer systems process large amounts of data. If there is a problem in the data or in the software used to process the data, then any downstream processes will be affected negatively. It is important to detect those problems as soon as possible to return the computer system to its properly functioning state. If those downstream processes support end-users, then early detection is even more imperative.

Detecting a problem in a computer system may be accomplished by detecting an anomaly in the data that the computer system processes. However, when an anomaly in data is identified, the anomaly might not reflect an error or problem at all. Instead, many anomalies reflect changes in natural user interaction with the computer system. For example, many users might visit a website during traditional after work hours, while the website might not experience much traffic during work hours. Therefore, notifying a system administrator of non-issues would waste the system administrator's time. Also, too many notifications of non-problem anomalies might cause a system administrator to ignore future anomalies that represent legitimate computer problems.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings:

FIGS. 3B-3D are screenshots of example pages that an anomaly detection system generates, in an embodiment;

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

A system and method are provided for auto-tuning anomaly detection. An anomaly detection system (ADS) trains multiple new models over the passage of time based on new labels contributed by one or more system administrators. A system administrator may define circumstances in which an anomaly is detected. Such a definition may become a training instance that is used to train a new model. Also, a system administrator may report on actual anomalies, as well as confirm or rebut a previous anomaly detection. Such reports may become training instances that are used to train a new model. The ADS may also select a threshold cutoff based on best precision with maximum recall.

System Overview

Figure 1:
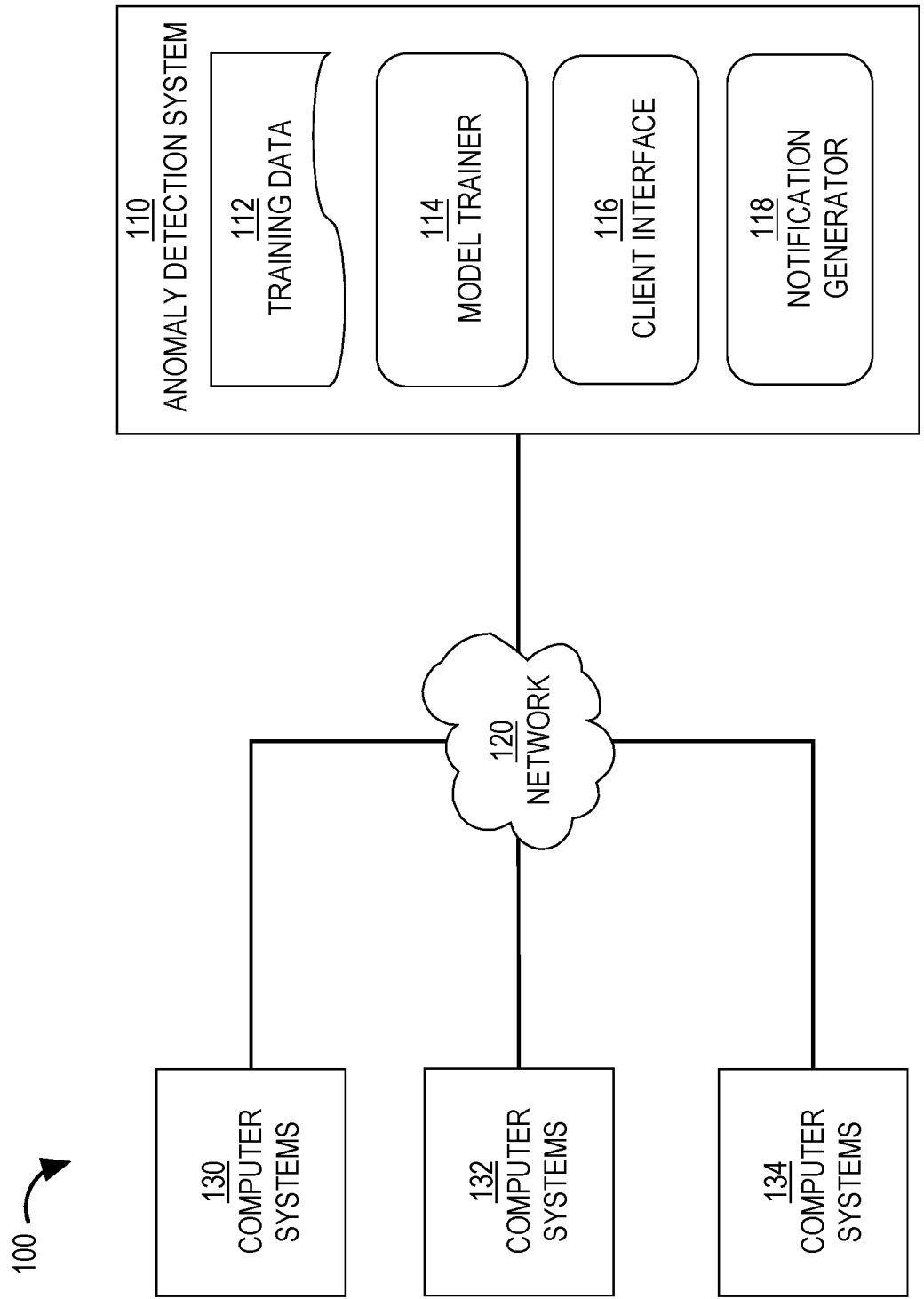
FIG. 1 is a block diagram that depicts an example anomaly detection system, in an embodiment.

FIG. 1 is a block diagram that depicts an example system architecture 100 that includes an anomaly detection system (ADS) 110, in an embodiment. System architecture 100 includes the ADS 110, a network 120, and computer systems 130-134.

Anomaly detection system (ADS) 110 comprises training data 112, model trainer 114, client interface 116, and notification generator 118. Training data 112 comprises multiple severity-duration pairs and, for each pair, a label that indicates whether the pair represents an anomaly. For example, a label may be '0' indicating no anomaly or '1' indicating an anomaly.

Each severity-duration pair comprises two values: a value indicating a severity and a value indicating a duration. "Duration" refers to a minimum time to detection (MTTD). A duration may be in any time value, such as seconds, minutes, or hours. A severity may be in any unit, such as percentage change, absolute difference with a mean or median value, or site-wide impact (or contribution of dimension). Thus, if a particular amount of detected severity occurs for longer than a particular duration corresponding to that severity, then an anomaly is detected and reported.

Model trainer 114 uses one or more machine learning techniques to train a model (also referred to herein as an "anomaly classifier") based on training data 112. An example technique includes logistic regression. Details regarding using logistic regression to train a classifier are provided below. Embodiments are not limited to this machine learning technique.

Network 120 may be implemented on any medium or mechanism that provides for the exchange of data between computer systems 130-134 and ADS 110. Examples of network 120 include, without limitation, a network such as a Local Area Network (LAN), Wide Area Network (WAN), Ethernet or the Internet, or one or more terrestrial, satellite or wireless links.

Types of Anomalies

ADS 110 is communicatively coupled to computer systems 130-134. Although three computer systems are depicted, ADS 110 may be communicatively coupled to more or fewer computer systems. Each computer system 130-134 detects changes in different types of data. The types of data can vary greatly. For example, one type of anomaly corresponds to a change in a number of impressions of content items from all content delivery campaigns, another type of anomaly corresponds to a change in a number of impressions of a content item from a particular content delivery campaign, another type of anomaly corresponds to a change in a click-through rate (CTR) for a particular demographic, another type of anomaly corresponds to a change in a number of content delivery campaigns that have been paused, and another type of anomaly corresponds to a change in a number of content delivery campaigns that have become active. These changes may be tracked on any time basis, such as every second, every minute, every hour, or every day.

For each type of change, ADS 110 may generate a different model. Thus, if computer system 130 provides, to ADS 110, data about three types of changes, then ADS 110 maintains three different sets of training data and model trainer 114 trains at least three different models, one for each of the three types of changes.

Data Pre-Processing and Feature Generation

The initial data in training data 112 may originate from pre-generated anomalies (generated by other anomaly detection algorithms). Statistics about these anomalies are extracted and converted into training data, each training instance comprising a tuple: a severity, a duration, and a label. Intuitively, an anomaly with relatively high severity or with relatively long duration should be reported. Generally, an anomaly with relatively low severity and/or relatively short duration should not be reported. Thus, there is a tradeoff.

To prevent overfitting, extreme outliers are automatically removed from training data 112. An "extreme" outlier is a training instance that has a relatively high severity or a relatively high duration. An "extreme" outlier may be defined relative to an aggregation of the other values in training data 112. For example, an extreme outlier pertaining to severity is a training instance whose severity value is greater than five times the median severity value in training data 112. As another example, an extreme outlier pertaining to duration is a training instance whose duration value is greater than three times the median duration value in training data 112.

Training data 112 may include validation data (not shown) or may be separate from validation data. For example, model trainer 114 uses two-thirds of training data 112 to train a model and the remaining one-third of training data 112 to validate the model. Alternatively, the same data that model trainer 114 uses to train a model is used to validate the model. Validation data is structured similar to training data. Validation data is used to determine an accuracy of a trained model. Validating a model involves, for each validation instance in the validation data, using the model to generate a score for the validation instance, comparing the score to a score threshold (or p-cutoff, described in more detail below) to generate a result (e.g., "anomaly" or "no anomaly"), and comparing the result with the label of the validation instance to determine whether they match. Based on the number of matches and non-matches, a precision rate and a recall rate of the model may be computed.

Model Formula

User defined "true" anomalies either have high severity, long duration, or both. Anomalies with longer duration but low severity may be insignificant. Similarly, anomalies with high severity (e.g., a sharp increase) but short duration are more likely to be noise. Both of the two cases constitute false alarms. Hence, there is a trade-off between severity and duration. To model this fact, the following model formula may be used:

$$\log it = a + bxy\beta$$

where $\log it = \log(p/(1-p))$ and $p = P(\text{label}=\text{True}|(x,y))$. Given a set of training instances in the form of $(x_i, y_i, \text{label}_i)$, a goal is to minimize negative log-likelihood.

$$\text{Objective function} = -\Sigma_i(\text{label}_i \log(p_i) + (1-\text{label}_i)\log(1-p_i))$$

Due to the convexity of the objective function, a global minimum is guaranteed to be found.

Tradeoff Between Precision and Recall

In binary classification, "precision" is the fraction of relevant instances among the retrieved instances, while "recall" is the fraction of relevant instances that have been retrieved over the total amount of relevant instances. Precision may be viewed as a measure of exactness or quality, whereas recall is a measure of completeness or quantity. If a goal is to report all actual anomalies, then a recall of 110% is required. If the goal is that all reported anomalies are actual anomalies, then a precision of 110% is required.

In an embodiment, a p-cutoff is selected to ensure the highest possible recall. A p-cutoff is a score that the model generates that represents the lowest possible score of an actual anomaly that is labeled as such in the validation data. Thus, the model will have a recall of 110%. For example, if a score of 0.56 catches all actual anomalies in the validation data, then the p-cutoff will be 0.56. Thereafter, if any severity-duration pair that is input to the model has a model-generated score that is greater than the p-cutoff will be classified as an anomaly that will be reported.

Visual Feedback of Model

Figure 2A:
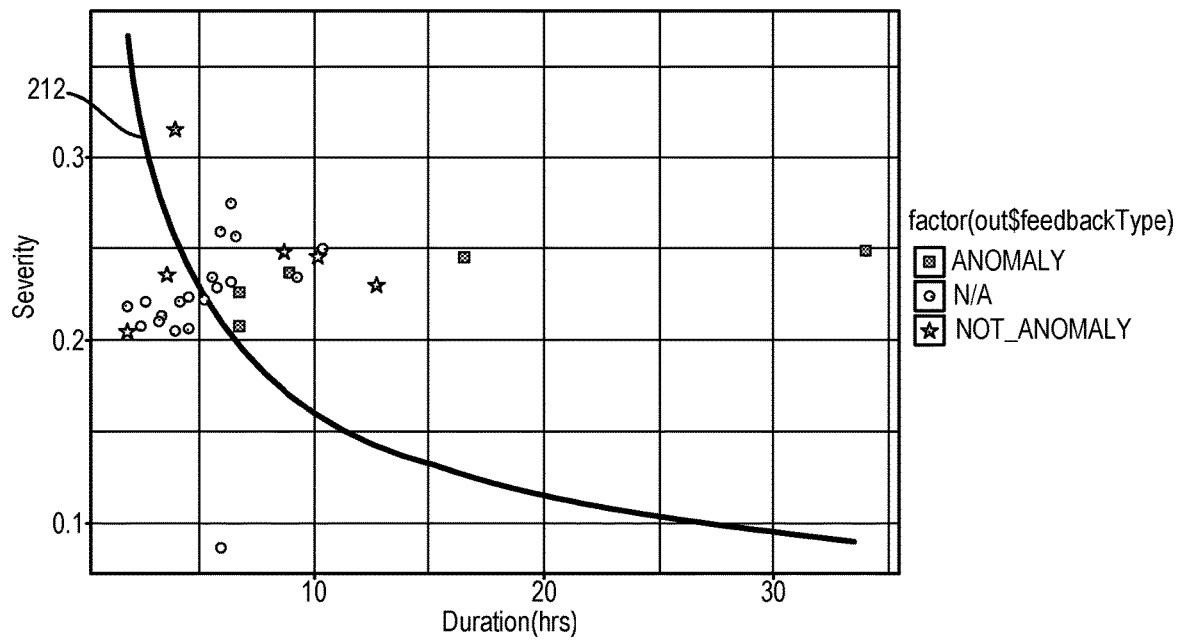
FIGS. 2A-2E comprise charts illustrating a relationship between severity and duration and how that relationship affects anomaly detection, in an embodiment.

FIG. 2A comprises a chart 210 that comprises an x-axis for duration, a y-axis for severity, data points corresponding to labeled anomalies and labeled non-anomalies, and a line 212 that corresponds to a p-cutoff that provides a 100% recall rate. "N/A" in the legend of chart 210 refers to anomalies without feedback. Such anomalies are treated as non-anomalies when training an auto-tuned classifier, but the weight for the N/A points are, in one embodiment, less (e.g., 0.5) than the weight for "regular" true anomalies (e.g., 1.0). The precision of this p-cutoff is 0.56. Chart 210 represents a visual feedback of the performance of the trained model. Based on this data, ADS 110 may generate the following table that illustrates different severity-duration pairs at different severity thresholds given the above p-cutoff:

| Severity (change in percentage) | Duration (hours) |
|---|---|
| 0.3 | 2.847 |
| 0.2 | 6.407 |
| 0.1 | 25.62 |

This information may be presented, through client interface 116, to a user (e.g., system administrator) of a computer system that is being monitored. This allows the user to see what kinds of severity-duration pairs will or will not cause an anomaly detection.

Notification Generator

As depicted in FIG. 1, ADS 110 includes notification generator 118, which generates a notification in response to being notified that a model has generated a score for a severity-duration pair that is greater than an established p-cutoff. The notification may be in the form of an email message, a text message, an HTTP message, or an API call that a system administrator's computer system receives, analyzes, and performs some action as a result, such as updating a table of notifications, updating a dashboard on a computer display, generating an email message, and/or causing a text message to be sent.

A notification may include an (e.g., unique) anomaly identifier that ADS 110 generates and stores. Thus, ADS 110 may include an historical anomaly report store (not depicted) that stores information about previously detected anomalies and, optionally, previously determined non-anomalies. An anomaly identifier may be stored in association with a severity value, a duration value, a timestamp indicating when the anomaly was detected, a timestamp indicating when a notification about the anomaly was transmitted, a response indicator indicating whether a response from a user regarding the anomaly was received, and a model identifier identifying which model was used to detect the anomaly (if there is more than one model).

If the historical anomaly report store includes data about non-detected anomalies, then each record of a non-detected anomaly may include a non-anomaly identifier, a severity value, a duration value, a timestamp indicating when the non-anomaly was received (e.g., from one of computer systems 130-134) or detected, a timestamp indicating when a score for the non-anomaly was generated, and a model identifier identifying which model was used to score the non-anomaly (if there is more than one model).

Customized Constraint: Duration

In an embodiment, a user is able to specify one or more thresholds for a duration for certain severities. These user-specified severity-duration pairs become training instances and are used by model trainer 114 to train a new model. Such user-specified pairs may be specified immediately after showing how a newly trained model performs relative to validation data. Thus, a newly trained model might not actually be used in production or in a live environment. Instead, the training data upon which the newly trained model is supplemented to include the user-specified pairs and model trainer 114 trains a new model based on the supplemented training data.

For example, a user specifies a 25% change (for the severity feature) and 2.0 hours for a minimal-time-to-detect (MTTD) or duration. In response, ADS system 110 generates a training instance (e.g., {0.25, 2.0, TRUE}). If the tuning strategy is to keep maximum recall while finding the highest precision, then the data point represented by this training instance is guaranteed to pass the p-cutoff boundary. Hence, the MTTD/duration requirement will be met.

Figure 3A:
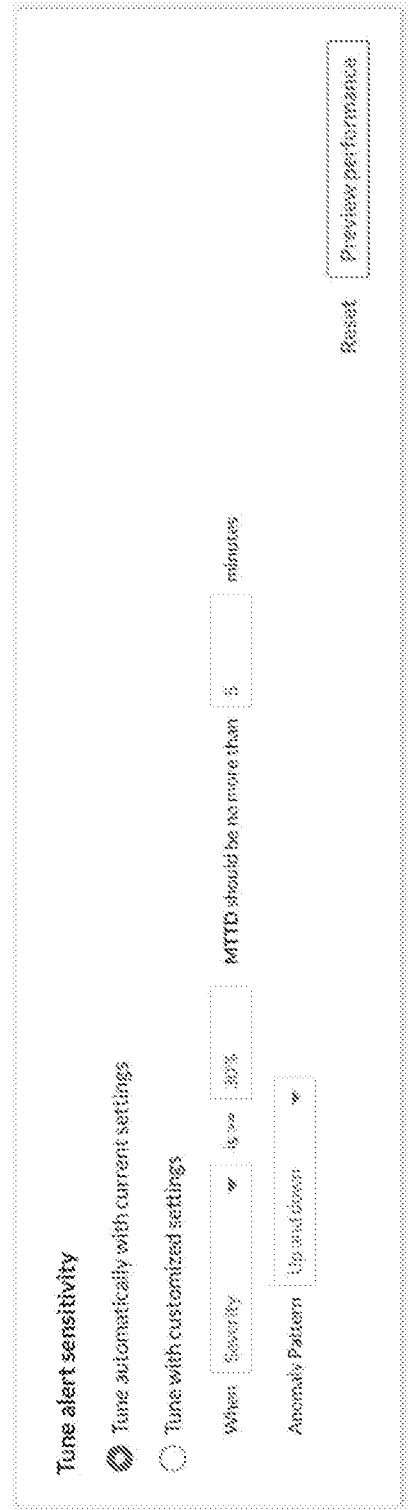
FIG. 3A is a screenshot of an example user interface, in an embodiment.

FIG. 3A is a screenshot of an example user interface 310 that allows a user (e.g., an administrator) to specify a MTTD for a particular severity type. UI 310 includes a first option to tune automatically with current settings and a second option to tune with customized settings. A current/default setting is tuning anomaly detection without any MTTD constraint; thus, tuning is based on anomaly feedback only. If the second option is selected, then the user may set four values: a severity setting (e.g., percentage change, absolute value of change, site-wide impact (e.g., contribution to total dimensions), a severity value, a duration (or MTTD) value, and an anomaly pattern setting. Anomaly patterns are "up" (meaning anomalies with increased change) or "down" (meaning anomalies with decreased change).

UI 310 also includes two buttons: a "Reset" button and a "Preview performance" button. If either button is selected, a client application that generated UI 310 sends the inputted values to ADS 110, which uses the inputted values to create a new training instance that comprises the severity value, the duration value, and a label that indicates that this severity-duration pair is an anomaly. The new training instance is added to training data 112 and, optionally, one or more (e.g., "old") training instances are removed from training data 112. ADS 110 then trains a new model based on training data 112 that includes the new training instance. If the "Reset" button in UI 310 was selected, then the new model is automatically put into production, replacing the current model. If the "Preview performance" button in UI 310 was selected, then performance metrics (e.g., precision and recall rate) pertaining to the new model are displayed to a user without the new model replacing the current model. The display may include a user-selectable option that, when selected, causes ADS 110 to replace the current model by activating the new model in its place so that the new model is used in production to detect subsequent anomalies.

Figure 2B:
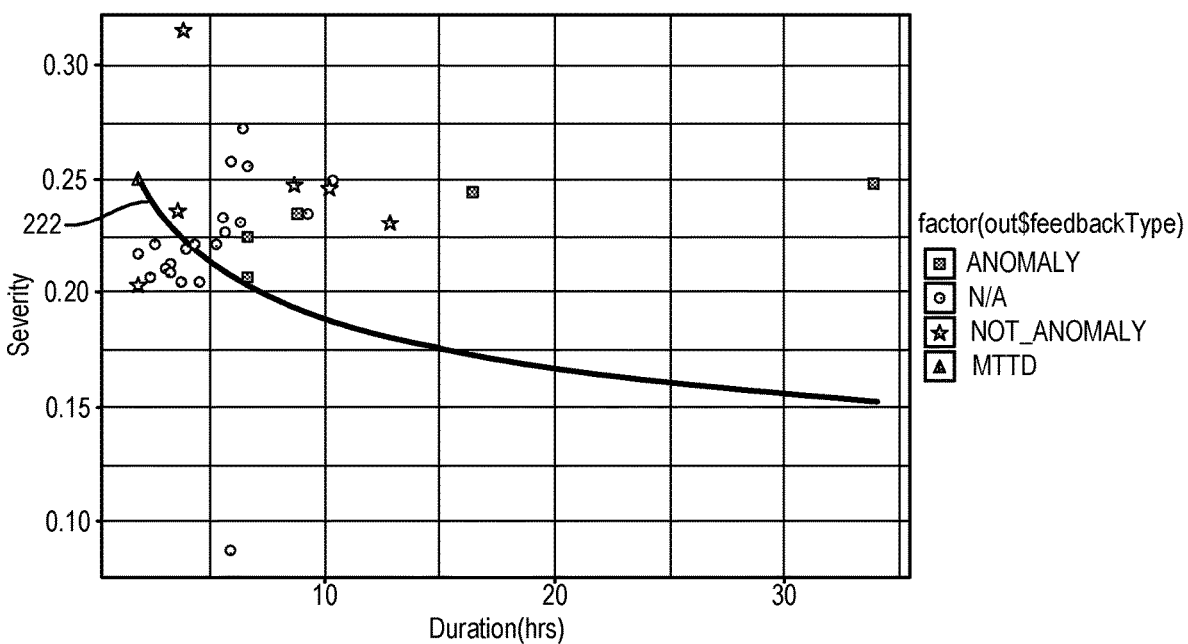

FIG. 2B comprises a chart 220 that is similar to chart 210, except that the training data includes the training instance described above (e.g., {0.25, 2.0, TRUE}) for the user-specified pair. Thus, line 222 corresponds to a p-cutoff that provides a 100% recall rate. The precision of this p-cutoff is 0.5. Compared to line 212, line 222 is nesting down and closer to the axes. Also, the precision is lower. Thus, with a user-specified pair, a drop in precision is possible, but the duration is satisfied. The following table illustrates updated severity-duration pairs at different severity thresholds given the new p-cutoff:

| Severity (change in percentage) | Duration (hours) |
| --- | --- |
| 0.3 | 0.703 |
| 0.25 | 1.988 |
| 0.1 | 368.80 |

Customized Constraint: User-Reported Anomaly

In an embodiment, ADS 110 receives user-reported anomalies that were missed by ADS 110. The user-reported anomalies may be received from a client device, over a network (e.g., a LAN, WAN, or the Internet), through client interface 140.

A user that initiates a user-reported anomaly may do so without specifying any value in a severity-duration pair, only input that indicates that an anomaly occurred (and, therefore, was missed by ADS 110) or that a system-identified anomaly is not an anomaly. For example, a notification from ADS 110 about a detected anomaly may include one or more options that an intended recipient of the notification may select that confirms whether the detected anomaly is an actual anomaly. An option may be in the form of a graphical button that, if selected, automatically generates a response and transmits the response to ADS 110. Alternatively, the intended recipient includes text that the recipient enters, for example, with a keyboard. Either way, the response indicates whether the detected anomaly is a true or actual anomaly. The notification and the response may include an anomaly identifier that allows ADS 110 to associate the response with the corresponding notification. When a response is received, ADS 110 may generate a new training instance that becomes part of training data 112. The new training instance includes a severity value that is associated with the anomaly identifier, a duration value that is associated with the anomaly identifier, and a label (that indicates whether the detected anomaly is an actual anomaly) that is determined based on the corresponding response.

In an embodiment, a user-reported anomaly indicates that an anomaly occurred at a certain time, but that ADS 110 did not generate a notification about the anomaly. That means that a score generated by a current model was lower than a p-cutoff associated with the current model. A user of one of computer systems 130-134, through a user interface, provides input that indicates that a true anomaly occurred. The input may include a date and time in which the anomaly occurred. Submitting the input causes a report message to be generated and transmitted to ADS 110. Thus, the user-reported anomaly that ADS 110 receives may indicate a timestamp (e.g., indicating a date and time) that ADS 110 uses to look up a severity-duration pair that is associated with the same (or similar) timestamp. ADS 110 generates a new training instance that includes the severity value and the duration value of the severity-value pair, along with a label indicating that the severity-duration pair represents a true or actual anomaly. In this way, A user-reported anomaly may trigger one or more actions. Example actions include (1) model trainer 114 training a new model using the user-reported anomaly as a training instance and (2) moving the p-cutoff of a current model.

If both actions are supported, then the decision of which action to perform is based on one or more criteria. An example criterion is whether a user-reported anomaly overlaps existing anomalies. "Existing" anomalies refer to anomalies that have already been detected by ADS 110 and refer to anomalies in the training data. User-report anomalies can overlap with system-detected anomalies. When a user-reported region is covered by system-detected anomalies for more than, for example, 50%, then this is considered a "match". If there is sufficient overlap, then a new model is trained; otherwise, the p-cutoff is moved.

Figure 2C:
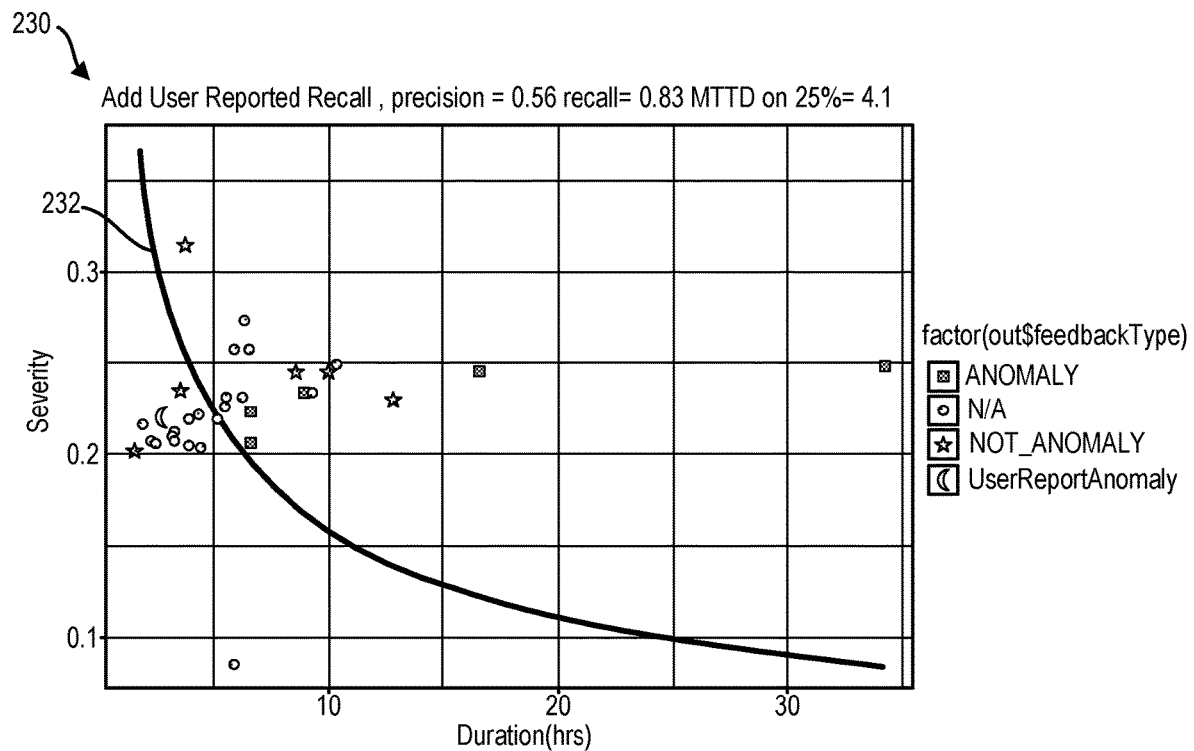

FIG. 2C comprises a chart 230 that is similar to chart 210, except that a user-reported anomaly is included and shows that the recall is now 0.83 instead of 1.0. The user-reported anomaly has a severity of approximately 0.22 and a duration of approximately 2.5 hours.

Figure 2D:
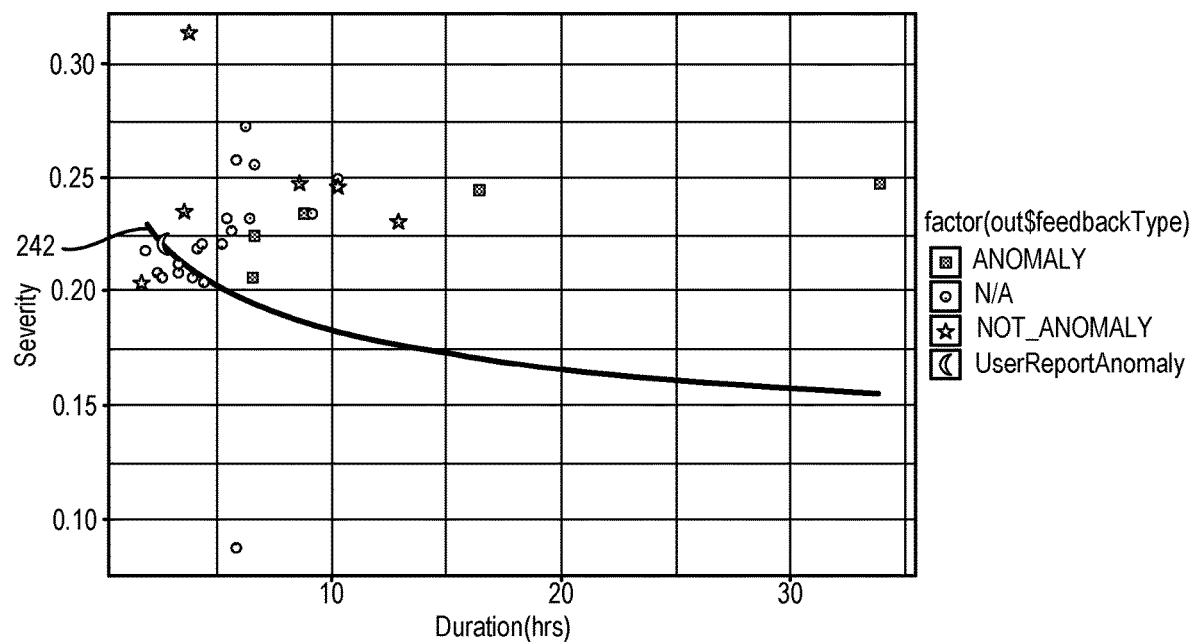

FIG. 2D comprises a chart 240 that is similar to chart 210, except that chart 240 is based on a new model that is trained based on a user-reported anomaly. The user-reported anomaly has a severity of approximately 0.22 and a duration of approximately 2.5 hours. Line 242 corresponds to a p-cutoff that provides 110% recall (which is up from 83% from line 232 in chart 240) and a precision of 55% (which is down from 56% from line 232 in chart 240). The following table illustrates two updated severity thresholds and their corresponding durations according to line 242 that may be presented to a user (e.g., through client interface 140):

| Severity (change in percentage) | Duration (hours) |
|---|---|
| 0.3 | 0.303 |
| 0.25 | 1.108 |

Combining Multiple Goals for Tuning

In an embodiment, ADS 110 supports both user-specified severity-duration pairs and user-reported anomalies. If ADS 110 receives both a user-specified pair and a user-reported anomaly is received, then a training instance is automatically generated for both data items and used by model trainer 114 to train a new model that satisfies these new data points and select a p-cutoff that satisfies one or more predefined criteria, such as a recall of 110%.

Figure 2E:
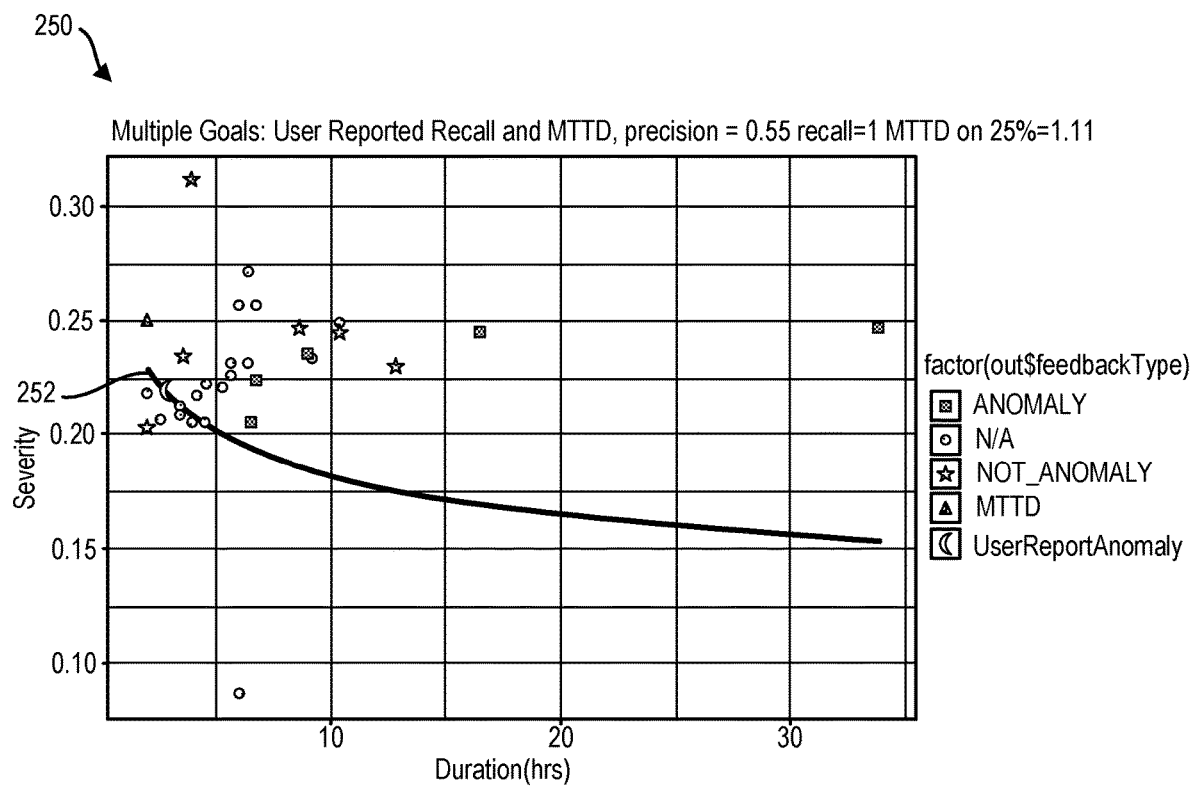

FIG. 2E comprises a chart 250 that is similar to chart 210, except that chart 250 is based on a new model that is trained based on a user-specified severity-duration pair and a user-reported anomaly. Line 252 corresponds to a p-cutoff that provides 110% recall and a precision of 55%. The following table illustrates two updated severity thresholds and their corresponding duration according to line 252 that may be presented to a user (e.g., through client interface 140):

| Severity (change in percentage) | Duration (hours) |
|---|---|
| 0.3 | 0.3037 |
| 0.25 | 1.1084 |

Alert Page

FIG. 3B is a screenshot of an example alert page 320 that ADS 110 generates based on current performance and settings, in an embodiment. Alert page 320 is displayed on a computing device that is separate from ADS 110. Alert page 320 indicates a number of anomalies that occurred over a period of time (e.g., the past day or week), a response rate indicating a percentage of detected anomalies that a user or administrator reviewed, a precision rate indicating a percentage of anomalies detected by ADS 110 that are true anomalies, a recall rate indicating a percentage of all anomalies detected by ADS 110, and a MTTD setting that is either a default setting or a setting established by a user/administrator. A reason why recall rate may be less than 100% is if a user/administrator reports an anomaly (to ADS 110) that was not detected by ADS 110.

Projected Performance

Figure 3C:
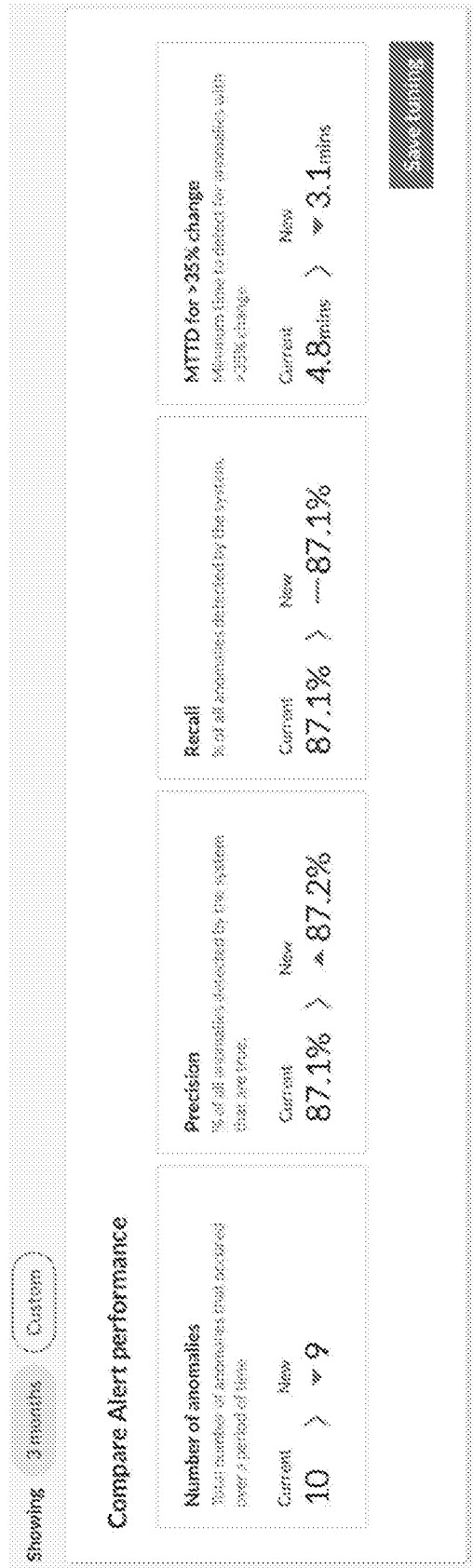

FIG. 3C is a screenshot of an example projected performance page 330 that ADS 110 generates, in an embodiment. Projected performance page 330 compares performance of a current anomaly classifier with performance of a newly trained, but not active, anomaly classifier. Projected performance page 330 is displayed on a computing device that is separate from ADS 110. Projected performance page 330 indicates a number of anomalies that were detected over a period of time (e.g., the past day or week) using the current anomaly classifier and a number of anomalies that would have been detected over that period of time using a newly trained anomaly classifier, a precision rate of the current anomaly classifier and a precision rate of the newly trained anomaly classifier (in this example, the precision rate would increase), a recall rate of the current anomaly classifier and a recall rate of the newly trained anomaly classifier (in this example, the recall rate would remain the same), and a MTTD setting of the current anomaly classifier and a MTTD setting of the newly trained anomaly classifier (in this example, the duration setting of the newly trained anomaly classifier is lower than the duration setting of the current anomaly classifier).

In an embodiment, projected performance page 330 (or another user interface) allows a user to make the newly trained anomaly classifier active, thus replacing the current anomaly classifier. For example, projected performance page 320 includes a graphical button that, when selected by the user, sends a message to ADS 110 to activate the newly trained anomaly classifier and deactivate the current anomaly classifier. Thus, minimal user input is required to activate a newly trained anomaly classifier.

In a related embodiment, user input is not required to activate a newly trained anomaly classifier (and, thus, replace a currently active anomaly classifier). For example, ADS 110 compares first performance of a newly trained anomaly classifier with second performance of a current anomaly classifier along one or more metrics, such as number of anomalies detected, precision rate, and recall rate. If the first performance exceeds the second performance (across one or more metrics), then the newly trained anomaly classifier is activated and the current anomaly classifier is deactivated. Such a "switch" of anomaly classifiers may only be performed if certain metric values do not fall below certain thresholds. For example, if the recall rate of the newly trained anomaly classifier is greater than 85% (even though this recall rate may be lower than the recall rate of the current anomaly classifier, but has better performance relative to one or more other metrics), then the "switch" occurs.

Removed Anomalies

FIG. 3D is a screenshot of an example removed anomalies page 340 that ADS 110 generates, in an embodiment. Removed anomalies page 340 lists a set of anomalies that ADS 110 previously detected but that would have been detected under a newly trained anomaly classifier. Thus, removed anomalies page 340 allows a user of one of computer systems 130-134 to view what anomalies would have been missed with a newly trained anomaly classifier that is based on one or more new settings (e.g., a user-specified severity-duration pair) and/or updated training data. Removed anomalies page 340 is displayed on a computing device that is separate from ADS 110.

This set of anomalies may be determined by identifying a first set of anomalies that a current anomaly classifier has detected over a period of time, identifying a second set of anomalies that a newly trained anomaly classifier would have detected over that period of time if the newly trained anomaly classifier would have been active, and subtracting the second set from the first set. The resulting set from this difference operation includes anomalies that are in the first set but not in the second set.

Removed anomalies page 340 indicates a particular number of anomalies that were previously detected but that would not be detected with a newly trained anomaly classifier (i.e., 10 in this example), a number of the particular number of anomalies that are considered true anomalies (i.e., 2 in this example), a number of the particular number of anomalies that are considered false alarms (or not true anomalies) (i.e., 8 in this example), and a number of the particular number of anomalies that are user-created (i.e., 0 in this example).

Removed anomalies page 340 also lists attributes of each anomaly in the particular number of anomalies, including a start date/time, a duration of the anomaly, a country in which the anomaly was detected, a name of a page with which the anomaly was detected, a severity score, a current/WoW (week-over-week change), and a resolution, values of which may be "True Anomaly," "False Alarm," and "User reported."

Processing User-Provided Data Items

In an embodiment, ADS 110 receives one or more types of user-provided data items: user-specified severity-duration pairs (which may trigger training a new model) and user-reported anomaly (which might not trigger training a new model). Each type of user-provided data item is received as part of a message from a different computer system of computer systems 130-134. Each message indicates a source (identifying one of computer systems 130-134) and, optionally, a severity data type that indicates a type of change that is being tracked by the corresponding source. Each source-severity data type corresponds to a different set of training data and a different set of one or more machine-learned models. If a computer system is associated with only a single severity data type, then a single source indicator is sufficient to associate a user-provided data item with its corresponding training data.

Training a New Model

When training a new model based on user-provided data (e.g., a user-specified pair and/or a user-reported anomaly), the same training data that was used to train the current model may be used, in addition to the user-provided data, to train the new model.

In an embodiment, the training data that model trainer 114 uses to train a new model is based on a limited set of data that changes as new data is received and/or as time passes. For example, training data 112 is limited to severity-duration pairs from the most recent thirty days. Thus, if a severity-duration pair is older than thirty days, then model trainer 114 (or another component of ADS 110) removes that pair from training data 112. As another example, training data 112 is limited to the most recent forty training instances. Thus, if there are forty training instances and a new training instance is received, then model trainer 114 (or another component of ADS 110) removes the oldest training instance from training data 112 and adds the new training instance to training data 112.

Restraining Updated Model

In the situation where "old" training instances are removed from training data 112 and "new" training instances are added to training data 112, the new training instances may not be as representative as the old training instances. For example, new positive labels may be outliers that are very far from the p-cutoff (represented by a line, such as line 232) of the current model. If the new positive labels are used to train a new model, then the p-cutoff of the new model may be shifted a significant distance to the right and/or up relative to the p-cutoff line of the current model. Thereafter, actual anomalies might not be detected or reported.

In an embodiment, to account for this situation, a recalibration is applied to new training instances that are determined to be relatively far from the p-cutoff of the current label. One or more factors of each new training instance may be analyzed to determine whether the new training instance is an outlier. An example of a recalibration is adjusting the duration value of a new training instance downward such that the adjusted duration value plus the actual severity value is on or near (e.g., within a certain number of units or within a certain percentage of) the line defined by the p-cutoff of the current model. The recalibrated or adjusted training instance is then used to train a new model. As another example, the severity value of a new training instance is adjusted downward such that the adjusted severity value plus the actual duration value is on or near (e.g., within a certain number of units or within a certain percentage of) the line defined by the p-cutoff of the current model.

In a related embodiment, the number of new training instances (i.e., that have not yet been used to train a model, or at least the current model) is a factor in whether recalibration is performed. For example, if there are less than ten training instances, then recalibration is performed. As another example, if the number of outlier training instances in the current training data (from which one or more old training instances have been removed and to which one or more new training instances have been added) is greater than a certain percentage (e.g., 20%) of the total number of training instances in the current training data, then recalibration is performed for at least a subset of the new outlier training instances.

Process Overview

Figure 4:
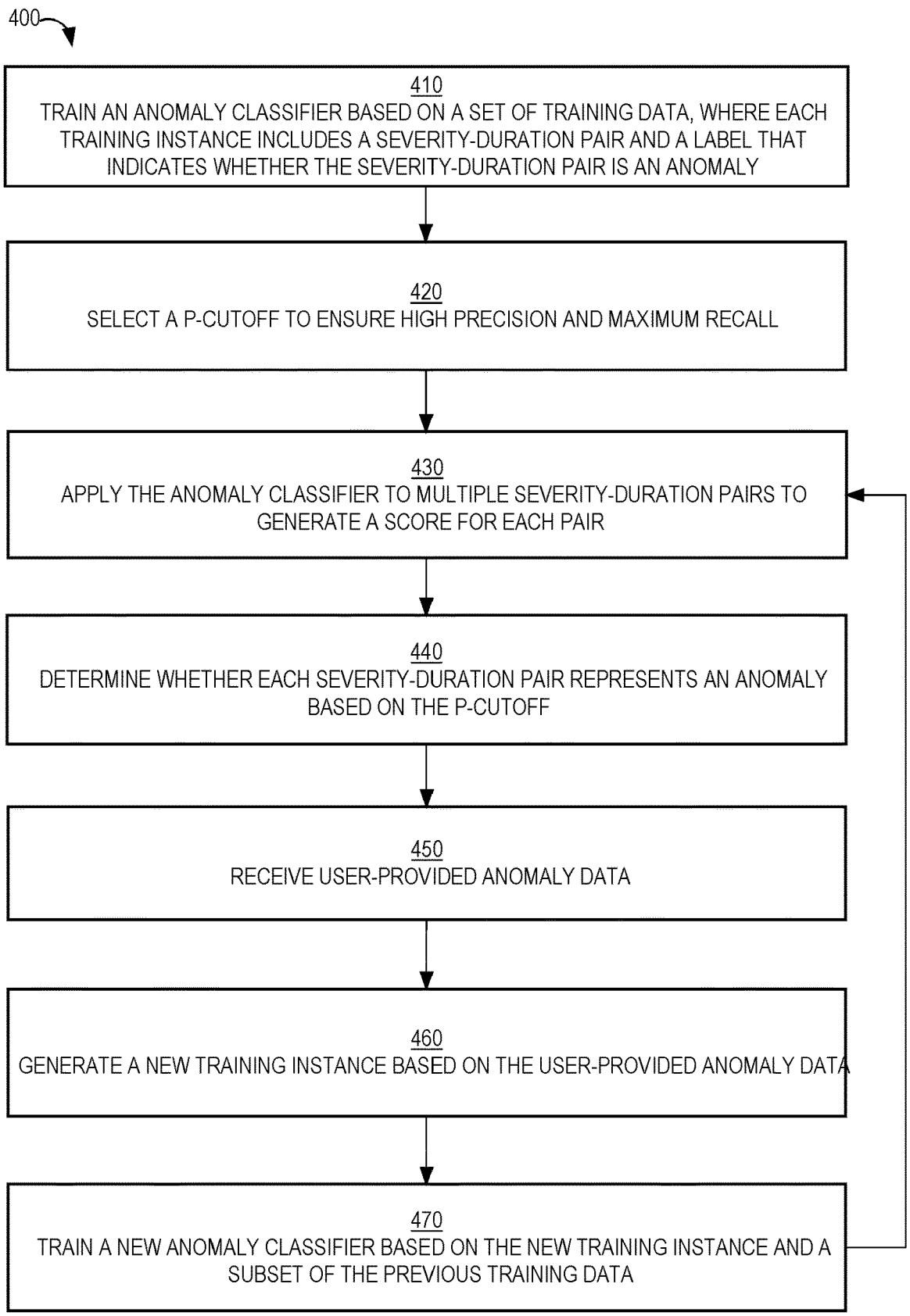
FIG. 4 is a flow diagram that depicts a process for detecting anomalies, in an embodiment.

FIG. 4 is a flow diagram that depicts a process 400 for processing anomaly data, in an embodiment. Process 400 may be implemented by one or more components of ADS 110.

At block 410, a machine-learned anomaly classifier is trained based on a first set of training data, each training instance including a severity-duration pair and a label that indicates whether the severity-duration pair is an anomaly.

At block 420, a p-cutoff is selected to ensure high precision and maximum recall. Alternatively, a p-cutoff is selected that ensures highest precision given a minimum level of recall (e.g., 90%).

At block 430, the anomaly classifier accepts multiple severity-duration pairs as input and generates a score for each pair.

At block 440, a determination of whether each severity-duration pair represents an anomaly is made based on the score of the pair and the p-cutoff. If the score of a severity-duration pair is above the p-cutoff, then an alert or notification is generated and sent.

At block 450, a user-provided anomaly data is received. The user-provided anomaly data may comprise a user-specified severity-duration pair (which does not reflect an actual anomaly that has occurred) or a user-reported anomaly (which is one that was an actual anomaly, but that was not detected by ADS 110).

At block 460, a new training instance is generated based on the user-provided anomaly data. The new training instance includes a label that indicates that the user-specified severity-duration pair represents an anomaly.

At block 470, a new anomaly classifier is trained based on the new training instance and a subset of the previous training data. Block 470 might not be performed if it is determined that the user-provided anomaly data comprises a user-specified severity-duration pair that would have been classified as an anomaly based on a score generated by the current anomaly classifier.

Process 400 proceeds to block 430, where the additional severity-duration inputs are received and the new anomaly classifier generates a score for each severity-duration pair.

Benefits

Embodiments described herein provide multiple technical benefits and represent an improvement in computer-related technology. For example, a machine-learned anomaly classifier is able to capture nonlinear correlations relative to a rule-based model. Another advantage of a machine-learned anomaly classifier over a rule-based model is that the hand-selection of values in the rule-based model is error-prone, time consuming, and non-probabilistic, whereas the machine-learned values of the anomaly classifier are not error-prone or time consuming and are probabilistic. Another advantage of a machine-learned anomaly classifier over a rule-based model is that output of a rule-based model is an unbounded positive or negative value whereas output of a machine-learned anomaly classifier is bounded. Furthermore, the output of a rule-based model does not intuitively map to a classification. In contrast, machine learning methods are probabilistic and therefore can give intuitive classifications.

Other computer-related improvements reflected in some embodiments described herein include seamless incorporation of user feedback on historically detected and reported anomalies, automatically selecting a threshold cutoff based on best precision with maximum recall, and supporting customized constraints to control a minimum time to detect an anomaly having a particular severity.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
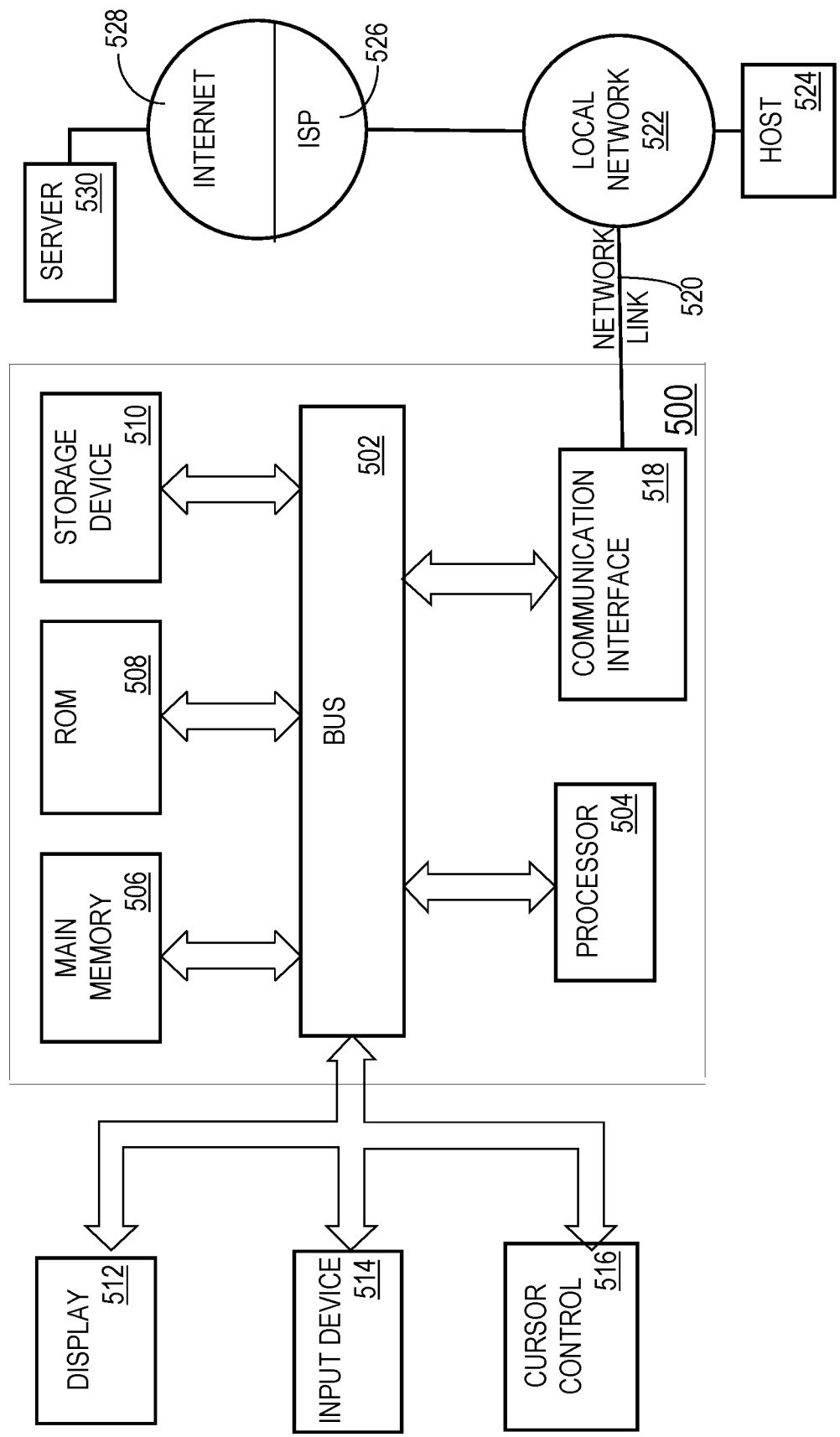
FIG. 5 is a block diagram that illustrates a computer system upon which an embodiment of the invention may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, optical disk, or solid-state drive is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hardwired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   storing training data that comprises a plurality of training instances, each of which comprises a severity-duration pair and a label that indicates whether the severity-duration pair represents an anomaly;
   using one or more machine learning techniques to train a model based on a first subset of the training data;

identifying a second subset of the training data, wherein each training instance in the second subset includes a positive label that indicates that said each training instance represents an anomaly;

based on the second subset of the training data, generating, using the model, a plurality of scores, wherein each score corresponds to a different training instance in the second subset;

identifying a minimum score of the plurality of scores that ensures a particular recall rate relative to training instances in the second subset;

in response to receiving a particular severity-duration pair, using the model to generate a particular score for the particular severity-duration pair;

generating a notification of an anomaly if the particular score is greater than the minimum score;

wherein the method is performed by one or more computing devices.

2. The method of claim 1, further comprising:
generating and transmitting, to a remote computing device, performance data that indicates a number of anomalies that the model detected and reported, a response rate, a precision rate of the model, a recall rate of the model, and a user-specified severity-duration pair upon which the model is trained.

3. The method of claim 1, further comprising:
receiving, from a remote computing device, user-provided anomaly data;
based on the user-provided anomaly data, generating a new training instance that comprises a particular severity, a particular duration, and a particular label that indicates whether the particular severity and the particular duration represents an anomaly;
using the one or more machine learning techniques to train an updated model based on the new training instance.

4. The method of claim 3, wherein the user-provided anomaly data includes a timestamp but does not include the particular severity or the particular duration, the method further comprising:
in response to receiving the user-provided anomaly data, determining, based on the timestamp, the particular severity and the particular duration.

5. The method of claim 3, wherein the user-provided anomaly data includes the particular severity and the particular duration.

6. The method of claim 3, further comprising:
generating and transmitting, to a remote computing device, projected performance data that indicates (1) a first performance of the model relative to a set of anomalies and (2) a second performance of the updated model relative to the set of anomalies;
wherein each of the first performance and the second performance indicate a plurality of performance metrics.

7. The method of claim 3, further comprising:
identifying a first set of anomalies that were detected using the model;
identifying a second set of anomalies that would have been detected by the updated model;
identifying a subset of the first set of anomalies that are not found in the second set of anomalies;
transmitting, to a remote computing device, information about the subset of the first set of anomalies.

8. The method of claim 7, wherein the information about the subset of the first set of anomalies includes two or more of a total number of the anomalies in the subset of the first set of anomalies, a number of true anomalies in the subset of the first set of anomalies, a number of false anomalies in the subset of the first set of anomalies, or a number of user-created anomalies in the subset of the first set of anomalies.

9. The method of claim 7, wherein the information includes, for each anomaly in the subset of the first set of anomalies, two or more of the following attributes: a date of said each anomaly, a duration of said each anomaly, a geographic location of said each anomaly, a severity of said each anomaly, or a resolution of said each anomaly.

10. The method of claim 3, further comprising:
updating the training data to generate updated training data that includes the new training instance and excludes a subset of plurality of training instances;
wherein the updated training data includes one or more training instances of the plurality of training instances;
wherein the updated model is trained based on the updated training data.

11. One or more storage media storing instructions which, when executed by one or more processors, cause:
storing training data that comprises a plurality of training instances, each of which comprises a severity-duration pair and a label that indicates whether the severity-duration pair represents an anomaly;
using one or more machine learning techniques to train a model based on at least a portion of the training data;
in response to receiving a particular severity-duration pair, using the model to generate a particular score for the particular severity-duration pair;
generating a notification of an anomaly if the particular score is greater than a particular threshold;
receiving, from a remote computing device, user-provided anomaly data;
in response to receiving the user-provided anomaly data and based on the user-provided anomaly data, generating a new training instance that comprises a particular severity, a particular duration, and a particular label that indicates whether the particular severity and the particular duration represents an anomaly;
using the one or more machine learning techniques to train an updated model based on the new training instance.

12. The one or more storage media of claim 11, wherein the instructions, when executed by the one or more processors, further cause:
generating and transmitting, to a remote computing device, performance data that indicates a number of anomalies that the model detected and reported, a response rate, a precision rate of the model, a recall rate of the model, and a user-specified severity-duration pair upon which the model is trained.

13. The one or more storage media of claim 11, wherein the user-provided anomaly data includes a timestamp but does not include the particular severity or the particular duration, wherein the instructions, when executed by the one or more processors, further cause:
in response to receiving the user-provided anomaly data, determining, based on the timestamp, the particular severity and the particular duration.

14. The one or more storage media of claim 11, wherein the user-provided anomaly data includes the particular severity and the particular duration.

15. The one or more storage media of claim 11, wherein the instructions, when executed by the one or more processors, further cause:

generating and transmitting, to a remote computing device, projected performance data that indicates (1) a first performance of the model relative to a set of anomalies and (2) a second performance of the updated model relative to the set of anomalies;

wherein each of the first performance and the second performance indicate a plurality of performance metrics.

16. The one or more storage media of claim 11, wherein the instructions, when executed by the one or more processors, further cause:

identifying a first set of anomalies that were detected using the model;

identifying a second set of anomalies that would have been detected by the updated model;

identifying a subset of the first set of anomalies that are not found in the second set of anomalies;

transmitting, to a remote computing device, information about the subset of the first set of anomalies.

17. The one or more storage media of claim 16, wherein the information about the subset of the first set of anomalies includes two or more of a total number of the anomalies in the subset of the first set of anomalies, a number of true anomalies in the subset of the first set of anomalies, a number of false anomalies in the subset of the first set of anomalies, or a number of user-created anomalies in the subset of the first set of anomalies.

18. The one or more storage media of claim 16, wherein the information includes, for each anomaly in the subset of the first set of anomalies, two or more of the following attributes: a date of said each anomaly, a duration of said each anomaly, a geographic location of said each anomaly, a severity of said each anomaly, or a resolution of said each anomaly.

19. The one or more storage media of claim 11, wherein the instructions, when executed by the one or more processors, further cause:

updating the training data to generate updated training data that includes the new training instance and excludes a subset of plurality of training instances;

wherein the updated training data includes one or more training instances of the plurality of training instances;

wherein the updated model is trained based on the updated training data.

20. The one or more storage media of claim 11, wherein the instructions, when executed by the one or more processors, further cause, prior to receiving the particular severity-duration pair:

identifying a subset of the training data, wherein each training instance in the subset includes a positive label that indicates that said each training instance represents an anomaly;

based on the subset of the training data, generating, using the model, a plurality of scores, wherein each score corresponds to a different training instance in the subset;

identifying a minimum score of the plurality of scores that ensures a particular recall rate relative to training instances in the subset;

wherein the particular threshold is based on the minimum score.

* * * * *